United States Patent [19]

Edagawa et al.

[11] Patent Number: 5,260,816
[45] Date of Patent: Nov. 9, 1993

[54] OPTICAL AMPLIFIER WITH ERBIUM-DOPED FIBER

[75] Inventors: Noboru Edagawa, Tokyo; Yoshihiro Yoshida, Saitama; Minoru Taya; Kazuo Koya, both of Gunma, all of Japan

[73] Assignees: Kokusai Denshin Denwa Co., Ltd.; Shin-Etsu Chemical Co., Ltd., both of Tokyo, Japan

[21] Appl. No.: 949,788

[22] Filed: Sep. 22, 1992

[30] Foreign Application Priority Data

Sep. 24, 1991 [JP] Japan .................. 3-272083

[51] Int. Cl.$^5$ .............. G02B 6/00; H01S 3/30
[52] U.S. Cl. ............... 359/341; 359/160; 372/6
[58] Field of Search ............ 359/341, 160; 385/1; 372/6

[56] References Cited

U.S. PATENT DOCUMENTS

| | | |
|---|---|---|
| 3,131,069 | 7/1992 | Hall et al. .......... 372/6 |
| 4,959,837 | 9/1990 | Fevrier et al. ......... 372/6 |
| 5,027,079 | 6/1991 | Desurvire et al. ...... 539/341 |

OTHER PUBLICATIONS

Ruhl, F F; Electronics Letters, vol. 27, No. 161 Aug. 1, 1991, pp. 1443-1445; Abst. only supplied.
Becker, P. C.; Laser Focus World, Oct. 1990; pp. 197-203.
Hagimoto et al; Proceeding of Optical Fiber Conference, 1989, pp. 15-1-3.

*Primary Examiner*—Nelson Moskowitz
*Attorney, Agent, or Firm*—McAulay Fisher Nissen Goldberg & Kiel

[57] ABSTRACT

The optical amplification gain of an optical amplifier consisting of an optical amplifier unit and a single-mode erbium-doped fiber can be optimized when the length of the fiber L in meters and the optical absorption in dB/meter of the fiber per unit length at a wavelength of 1.53 μm satisfy the relationship that $L \times y$ is in the range from 70 to 170 dB by appropriately selecting the doping level of the glass with erbium and the length of the fiber.

1 Claim, 2 Drawing Sheets

OPTICAL AMPLIFIER WITH ERBIUM-DOPED FIBER

BACKGROUND OF THE INVENTION

The present invention relates to an optical amplifier with an erbium-doped fiber or, more particularly, to an optical amplifier with an erbium-doped fiber of which the amplification gain characteristics can be optimized.

It is well known that a single-mode erbium-doped fiber can be used in optical amplifiers. The block diagram of FIG. 1 shows constitution of a typical optical amplifier of the backward pumping type. In this assembly, the signal power of, for example, 1.55 μm wavelength entering the isolator 1 for 1.55 μm wavelength and incident to the erbium-doped fiber 2 is introduced into the WDM (wavelength division multiplexer) coupler 6, along with excitation of laser emission by the pumping light 4 of 1.48 μm wavelength coming from the LD driver 3 and passing through the isolator 5 for 1.48 μm wavelength, from which the amplified signal power of 1.55 μm wavelength is outputted through the second isolator 7 for 1.55 μm wavelength. It is also known that, in an optical amplifier with an erbium-doped fiber in the 1.55 μm range of wavelength in the optical communication system, the gain characteristics thereof depend on the length of the optical fiber so that the highest gain is obtained only with an optimum length of the optical fiber. The optimum length of the optical fiber varies from 10 meters or shorter to 200 meters or longer depending on the doping level of the erbium dopant in the core of the optical fiber and structure of the optical fiber.

From the practical standpoint for optical amplification, it is important that the optimum length of the optical fiber is desirably within a certain range because, when the erbium-doped fiber for the optical amplifier is too long, the housing of the instrument also must undesirably be large enough in order to contain the so long optical fiber therein while, when the length of the optical fiber is too short, the gain may be subject to great variations even with a relatively small change in the length unavoidably caused due to the loss by cutting at the fiber terminals for the connection thereof to an optical amplifier. This is the reason for the requirement that an erbium-doped fiber for an optical amplifier is designed to have an optimum length of the optical fiber which falls within an appropriate range depending on the particular applications.

SUMMARY OF THE INVENTION

The present invention accordingly has an object to provide an improvement in an optical amplifier with an erbium-doped fiber of which the gain characteristics can be optimized by selecting the length of the optical fiber within an appropriate range depending on the particular applications.

Thus, the optical amplifier with an erbium-doped fiber provided by the invention comprises: an optical amplifier unit; and a single-mode erbium-doped fiber of which the optical absorption for a unit length of the optical fiber and the length of the fiber have a relationship defined by the equation $$L \times y = 120 \pm 50 \, dB, \quad (I)$$

or, namely, that $L \times y$ is in the range from 70 dB to 170 dB, in which L is the length of the optical fiber in meters and y is the optical absorption for a unit length of the optical fiber in dB/meter at a wavelength of 1.53 μm in the loss wavelength spectrum.

DETAILED DESCRIPTION OF THE PREFERRED EMBODIMENTS

Figure 1:
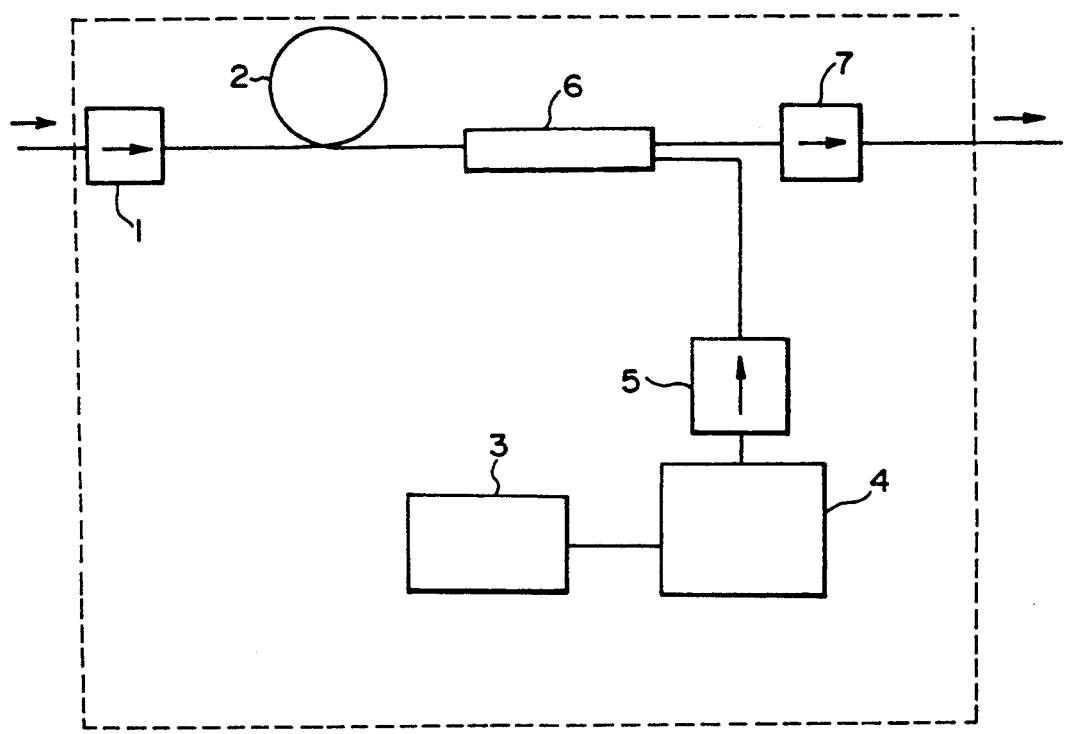
FIG. 1 shows a block diagram of a typical optical amplifier.

As is described above, the characteristic feature of the inventive optical amplifier with an erbium-doped fiber consists in that the optical fiber 2 in FIG. 1, of which the optical absorption for a unit length is y in dB/meter, has a length L in meters defined by the above given equation (I). When the length of the optical fiber is L meters, namely, the optical absorption must be within the range from 70/L dB to 170/L dB. The optical amplifying effect of an optical amplifier would be greatly decreased if this relationship is not satisfied.

The single-mode optical fiber used in the inventive optical amplifier is prepared from fused silica glass doped with erbium as a dopant. An optical fiber of fused silica glass is prepared by drawing a fused silica glass preform obtained from a porous deposit of fine silica particles containing germanium as a dopant as formed and deposited by the flame hydrolysis of a vapor mixture of a silicon compound such as silicon tetrachloride and a germanium compound such as germanium tetrachloride according to a known procedure of the VAD method or OVD method. Erbium-doped fused silica glass can be obtained by admixing the vapor mixture in the above described process with an erbium compound, sometimes, together with an aluminum compound as an additional dopant which serves to enhance the performance of the erbium dopant. Alternatively, the erbium dopant can be introduced into the fused silica glass in the liquid-phase method by impregnating the porous silica body with a solution of an erbium compound prior to vitrification into a transparent fused silica glass body. The doping level with erbium is selected such that the optical absorption per unit length y of the optical fiber 2 can be $(120 \pm 50)/L$ dB/meter assuming that the length L in meters of the optical fiber is within an appropriate range not to be too long nor to be too short to cause the above mentioned disadvantages.

In the following, the invention is illustrated in more detail by way of examples and comparative examples.

EXAMPLE 1

Hydrogen gas and oxygen gas were introduced into a concentric multi-nozzle burner of fused silica glass at rates of 3.0 liters/minute and 7.0 liters/minute, respectively, to form an oxyhydrogen flame. Vapors of silicon tetrachloride and germanium tetrachloride obtained by vaporization of the respective liquids heated at 40° C. and at 30° C., respectively, and each as carried by argon gas at rates of 0.205 liter/minute and 0.16 liter/minute, respectively, were mixed together and the vapor mixture was introduced into the center of the flame after passing through an evaporator in which aluminum trichloride was heated and vaporized at 150° C. so that the vapor mixture carried the vapor of aluminum trichloride. The fine particles of silica formed by the flame hydrolysis were deposited on a base so as to cause growth of a porous body of silica in the axial direction. The porous silica body obtained after 5 hours of deposition had a diameter of 60 mm, length of 260 mm, weight of 136 g and average bulk density of 0.178 g/cm$^3$.

The thus obtained porous silica body was dipped in and soaked with a methanol solution of erbium chloride to be infiltrated therewith to the core. The concentration of erbium chloride in the methanol solution was selected in such a way that the optical absorption of the optical fiber prepared therefrom was about 4 dB/meter at a wavelength of 1.53 μm in the loss wavelength spectrum assuming a target length of the optical fiber of 30 meters. The erbium-doped porous silica body was air-dried and then vitrified by heating at 1470° C. in an atmosphere of helium in an electric furnace. The concentrations of the dopant of erbium and aluminum were 400 ppm and 14,000 ppm, respectively, according to the results of the analysis by the ICP method.

The above obtained erbium-doped fused silica glass body as the core was provided with a cladding layer of fused silica glass to prepare a preform which was drawn into an optical fiber, of which the optical amplification characteristic was measured by mounting the same on the optical amplifier shown in FIG. 1 to find that the amplification gain for a signal light of 1.55 μm wavelength was 30 dB by the excitation with a pumping light of 18 mW in the 1.48 μm range. The optimum length of the optical fiber thus prepared was 30 meters with an optical absorption of 126 dB at a wavelength of 1.53 μm.

For comparison, the same measurement of the amplification gain as above was conducted except that the length of the optical fiber was shorter and longer than 30 meters so that the optical absorption loss through the fiber was 60 dB and 180 dB, respectively, to give results that the amplification gain at a wavelength of 1.55 μm was 20 dB and 15 dB, respectively.

EXAMPLES 2 TO 6

The experimental procedure in each of these Examples was substantially the same as in Example 1 except that the concentration of erbium chloride in the methanol solution for the infiltration of the porous silica body was varied so as to match various target values of the optimum length of the optical fiber 2 in FIG. 1.

Figure 2:
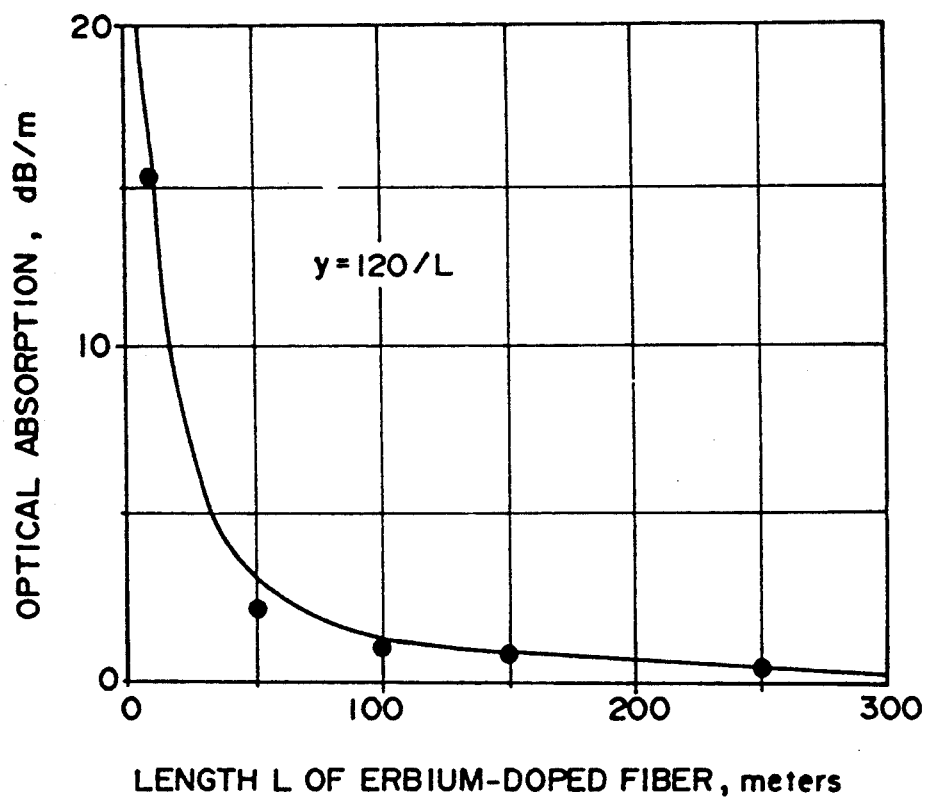
FIG. 2 is a graph showing the optical absorption per unit length of the optical fiber y in dB/meter at a wavelength of 1.53 μm as a function of the length L in meters of an erbium-doped fiber in an optical amplifier.

Each of the optical fibers prepared in these Examples could be excited with a pumping light of 18 mW in the 1.48 μm range and the amplification gain for a signal light of 1.55 μm wavelength was from 30 to 32 dB when the optical fiber had an optimum length. Table 1 below shows the optical absorption in these optical fibers for a length of 1 meter, i.e. y dB/meter, at a wavelength of 1.53 μm and the optimum lengths of the fibers, i.e. L meters, as well as the values of L×y in dB. Further, FIG. 2 of the accompanying drawing is a plot of these values of y vs. L and the solid-line curve therein is given for the equation of y=120/L.

When the optimum length of the optical fiber is as long as 250 meters as is the case in Example 2, the housing of the optical amplifier must be so large accordingly to cause self-explanatory disadvantages while, when the optimum length of the optical fiber 2 is so short as 8 meters as is the case in Example 6, even a very small decrease of only 15 cm in the length of the optical fiber, which is sometimes unavoidable by cutting the terminals of the fiber 2 for connection, may result in about 1 dB decrease of the amplification gain. Accordingly, it can be concluded that, in order that the optimum length of the optical fiber 2 can be around 30 meters, for example, the optical absorption for a unit length of the optical fiber should be about 4 dB/meter.

TABLE 1

| Example No. | y, dB/meter | L, meters | y × L, dB |
|---|---|---|---|
| 2 | 0.5 | 250 | 129 |
| 3 | 0.9 | 150 | 130 |
| 4 | 1.0 | 100 | 104 |
| 5 | 2.2 | 50 | 110 |
| 6 | 15.3 | 8 | 123 |

What is claimed is:

1. A method for determining the length L of an erbium-doped fiber in an optical amplifier comprising first, selecting a fiber having an optical absorption per unit length in dB/meter at a wavelength of 1.53 μm in the loss wavelength spectrum of y, and then, selecting a length L of said fiber such that:

$$L = \frac{120 \pm 50 \text{ dB}}{y}$$

* * * * *